:::page

(12) United States Patent
Hato

(10) Patent No.: US 8,221,236 B2
(45) Date of Patent: Jul. 17, 2012

(54) GAME PROCESS CONTROL METHOD, INFORMATION STORAGE MEDIUM, AND GAME DEVICE

(75) Inventor: Yoshikazu Hato, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 1076 days.

(21) Appl. No.: 11/892,790

(22) Filed: Aug. 27, 2007

(65) Prior Publication Data

US 2008/0058102 A1 Mar. 6, 2008

(30) Foreign Application Priority Data

Aug. 30, 2006 (JP) ................................. 2006-234163

(51) Int. Cl.
*A63F 9/24* (2006.01)
*A63F 13/00* (2006.01)

(52) U.S. Cl. ................................. 463/35; 463/36; 463/43

(58) Field of Classification Search .................. 463/7–9, 463/35–38
See application file for complete search history.

(56) References Cited

U.S. PATENT DOCUMENTS

| | | | | |
|---|---|---|---|---|
| 3,894,186 A * | 7/1975 | Humphrey et al. | ............ | 704/276 |
| 4,024,789 A * | 5/1977 | Humphrey et al. | ......... | 84/477 R |
| 4,081,829 A * | 3/1978 | Brown | ............................. | 381/56 |
| 4,257,062 A * | 3/1981 | Meredith | .................... | 84/464 R |
| 4,267,561 A * | 5/1981 | Karpinsky et al. | ............... | 381/56 |
| 4,331,062 A * | 5/1982 | Rogers | ............................. | 84/478 |
| 4,363,482 A * | 12/1982 | Goldfarb | ........................... | 463/9 |
| 4,366,741 A * | 1/1983 | Titus | ................................ | 84/478 |
| 4,392,409 A * | 7/1983 | Coad et al. | ...................... | 84/462 |
| 4,768,086 A * | 8/1988 | Paist | ................................ | 381/56 |
| 5,513,129 A * | 4/1996 | Bolas et al. | ..................... | 703/13 |
| 5,990,405 A * | 11/1999 | Auten et al. | .................... | 84/609 |
| 6,066,790 A * | 5/2000 | Freeland et al. | ................ | 84/454 |
| 6,313,843 B1 | 11/2001 | Tanii et al. | | |
| 6,379,244 B1 * | 4/2002 | Sagawa et al. | .................... | 463/7 |
| 6,464,585 B1 * | 10/2002 | Miyamoto et al. | ............. | 463/35 |
| 6,485,369 B2 * | 11/2002 | Kondo et al. | ................... | 463/43 |
| 6,541,692 B2 * | 4/2003 | Miller | ............................ | 84/634 |

(Continued)

FOREIGN PATENT DOCUMENTS

JP   B1 2860097   12/1998

(Continued)

OTHER PUBLICATIONS

"The Legend of Zelda: Ocarina of Time" Instruction Booklet. Copyright 1998 Nintendo Co., Ltd.*

(Continued)

*Primary Examiner* — Steven J Hylinski
(74) *Attorney, Agent, or Firm* — Oliff & Berridge, PLC

(57) ABSTRACT

Each note is detected from input sound in units of detection time at specific time intervals. Whether or not the player's input sound coincides with a reference melody set for an egg OB selected for causing a character to be created is determined based on the detected notes, and the character set for the egg OB is created when the input sound has been determined to coincide with the reference melody. Whether or not the input sound coincides with the reference melody is determined based on (1) the distribution of the notes included in the input sound with respect to the passage of time, or (2) the total count of each note included in the input sound.

16 Claims, 17 Drawing Sheets

:::

U.S. PATENT DOCUMENTS

| | | | |
|---|---|---|---|
| 6,645,067 B1 * | 11/2003 | Okita et al. | 463/7 |
| 6,898,759 B1 * | 5/2005 | Terada et al. | 715/202 |
| 6,905,414 B2 * | 6/2005 | Danieli et al. | 463/42 |
| 7,096,186 B2 * | 8/2006 | Funaki | 704/278 |
| 7,208,669 B2 * | 4/2007 | Wells et al. | 84/601 |
| 7,601,904 B2 * | 10/2009 | Dreyfuss et al. | 84/600 |
| 7,628,699 B2 * | 12/2009 | Onoda et al. | 463/36 |
| 7,799,984 B2 * | 9/2010 | Salter | 84/477 R |
| 2005/0101364 A1 * | 5/2005 | Onoda et al. | 463/7 |
| 2007/0163427 A1 * | 7/2007 | Rigopulos et al. | 84/609 |

FOREIGN PATENT DOCUMENTS

| | | |
|---|---|---|
| JP | A 11-73089 | 3/1999 |
| JP | A 11-197362 | 7/1999 |
| JP | A 2001-46740 | 2/2001 |
| JP | A 2001-232062 | 8/2001 |
| JP | A 2003-230766 | 8/2003 |
| JP | A 2003-302988 | 10/2003 |
| JP | A 2004-89489 | 3/2004 |
| JP | A 2006-102270 | 4/2006 |
| JP | A 2006-109966 | 4/2006 |

OTHER PUBLICATIONS

"Sonic Adventure DX Complete Guide," Nintendo GameCube Books, First Edition, pp. 190, Jul. 31, 2003.

"Hanjuku Hero, Oh, May the World Be Hanjuku!!," Snappy Cooking Guide, First Edition, pp. 10-11, Feb. 14, 2002.

U.S. Appl. No. 11/892,789, filed Aug. 27, 2007 by Yoshikazu Hato.

* cited by examiner

FIG. 7

[REFERENCE NOTE DATA]

| TIME t | NOTE | | | | | | | | | | | | | | | | | | | | | | |
|---|---|---|---|---|---|---|---|---|---|---|---|---|---|---|---|---|---|---|---|---|---|---|---|
| | DO | # | RE | # | MI | FA | # | SOL | # | LA | # | TI | DO | # | RE | ... | LA | # | TI | DO | ... | TI |
| $t_1$ | × | × | × | × | × | × | × | × | × | × | × | × | × | × | × | ... | × | × | × | × | ... | × |
| $t_2$ | O | × | × | × | × | × | × | × | × | × | × | × | × | × | × | ... | × | × | × | × | ... | × |
| $t_3$ | O | × | × | × | × | × | × | × | × | × | × | × | × | × | × | ... | × | × | × | × | ... | × |
| $t_4$ | × | × | × | × | × | × | × | × | × | × | × | × | × | × | × | ... | × | × | × | × | ... | × |
| $t_5$ | O | × | × | × | × | × | × | × | × | × | × | × | × | × | × | ... | × | × | × | × | ... | × |
| $t_6$ | O | × | × | × | × | × | × | × | × | × | × | × | × | × | × | ... | × | × | × | × | ... | × |
| $t_7$ | × | × | × | × | × | × | × | × | × | × | × | × | × | × | × | ... | × | × | × | × | ... | × |
| $t_8$ | × | × | × | × | × | × | × | O | × | × | × | × | × | × | × | ... | × | × | × | × | ... | × |
| ⋮ | | | | | | | | | | | | | | | | | | | | | | |
| $t_N$ | × | × | × | × | × | × | × | × | × | × | × | × | × | × | × | ... | × | × | × | × | ... | × |

O : INCLUDED
× : NOT INCLUDED

FIG. 8

[START REFERENCE NOTE DATA]

| TIMEt | NOTE |||||||||||||||||||||
|---|---|---|---|---|---|---|---|---|---|---|---|---|---|---|---|---|---|---|---|---|---|
| | DO | # | RE | # | MI | FA | # | SOL | # | LA | # | TI | DO | # | RE | ... | LA | # | TI | DO | ... | TI |
| $t_1$ | × | × | × | × | × | × | × | × | × | × | × | × | × | × | × | ... | × | × | × | × | ... | × |
| $t_2$ | O | × | × | × | × | × | × | × | × | × | × | × | × | × | × | ... | × | × | × | × | ... | × |
| $t_3$ | × | × | × | × | × | × | × | × | × | × | × | × | × | × | × | ... | × | × | × | × | ... | × |
| $t_4$ | × | × | × | × | × | × | × | × | × | × | × | × | × | × | × | ... | × | × | × | × | ... | × |
| $t_5$ | O | × | × | × | × | × | × | × | × | × | × | × | × | × | × | ... | × | × | × | × | ... | × |
| $t_6$ | × | × | × | × | × | × | × | × | × | × | × | × | × | × | × | ... | × | × | × | × | ... | × |
| $t_7$ | × | × | × | × | × | × | × | × | × | × | × | × | × | × | × | ... | × | × | × | × | ... | × |
| $t_8$ | × | × | × | × | × | × | × | × | O | × | × | × | × | × | × | ... | × | × | × | × | ... | × |
| ⋮ | | | | | | | | | | | | | | | | | | | | | | |
| $t_N$ | × | × | × | × | × | × | × | × | × | × | × | × | × | × | × | ... | × | × | × | × | ... | × |

O : START

FIG. 9

[REFERENCE NOTE DATA] 732d

| TIMEt | NOTE | | | | | | | | |
|---|---|---|---|---|---|---|---|---|---|
| | DO # | ⋯ | TI | DO # | ⋯ | TI | DO # | ⋯ | TI |
| $t_1$ | × × | ⋯ | × | × × | ⋯ | × | × × | ⋯ | × |
| $t_2$ | ○ × | ⋯ | × | × × | ⋯ | × | × × | ⋯ | × |
| $t_3$ | ○ × | ⋯ | × | × × | ⋯ | × | × ○ | ⋯ | × |
| $t_4$ | × × | ⋯ | × | × ○ | ⋯ | × | × ○ | ⋯ | × |
| ⋮ | | | | | | | | | |
| $t_N$ | × × | ⋯ | × | × × | ⋯ | × | × × | ⋯ | × |

COMBINES NOTES IN NOTE NAME UNITS

[NOTE-NAME-UNIT REFERENCE DATA] 732f

| TIMEt | NOTE |
|---|---|
| | DO # RE # MI FA # SOL # LA # TI |
| $t_1$ | × × × × × × × × × × × × |
| $t_2$ | ○ × × × × × × × × × × × |
| $t_3$ | ○ ○ × × × × × × × × × × |
| $t_4$ | × ○ × × ○ × × ○ × × × × |
| ⋮ | |
| $t_N$ | × × × × × × × × × × × × |

[LEVEL CONDITION DATA]

| 88% OR MORE OF MAXIMUM LEVEL |

[ NOTE DETECTION TOTAL COUNT DATA ]

| NOTE | DETECTION TOTAL COUNT ||
|---|---|---|
| | DETECTED NOTE DATA | START DETECTED NOTE DATA |
| DO | 20 | 10 |
| DO# | 15 | 7 |
| RE | 4 | 3 |
| RE# | 8 | 0 |
| MI | 29 | 18 |
| FA | 24 | 15 |
| FA# | 6 | 2 |
| SOL | 12 | 7 |
| SOL# | 2 | 0 |
| LA | 36 | 30 |
| LA# | 18 | 4 |
| TI | 24 | 20 |
| ALL NOTES | 198 | 116 |
| ALL BLACK-KEY NOTES | 49 | 11 |

FIG. 12

[SIMILARITY DETERMINATION DATA] 735

| DATA TYPE | DEGREE OF SIMILARITY |
|---|---|
| DETECTED NOTE DATA | 0.84 |
| START DETECTED NOTE DATA | 0.75 |
| NOTE-NAME-UNIT DETECTION DATA | 0.68 |
| NOTE-NAME-UNIT START DETECTION DATA | 0.79 |
| AVERAGE | 0.77 |

[SIMILARITY CONDITION DATA]

0.7 OR MORE

[NOTE COUNT CONDITION DATA]

| NOTE TYPE | NOTE COUNT CONDITION |
|---|---|
| EACH NOTE | WITHIN ±15% |
| ALL NOTES | WITHIN ±20% |
| ALL BLACK-KEY NOTES | WITHIN ±20% |

[NOTE COUNT DETERMINATION DATA] 738

| NOTE | DETERMINATION RESULT | |
|---|---|---|
| | DETECTED NOTE DATA (738a) | START DETECTION NOTE DATA (738b) |
| DO | ○ | × |
| DO# | ○ | × |
| RE | × | × |
| RE# | × | × |
| MI | ○ | ○ |
| FA | ○ | ○ |
| FA# | × | × |
| SOL | ○ | ○ |
| SOL# | × | × |
| LA | ○ | ○ |
| LA# | ○ | × |
| TI | ○ | ○ |
| ALL NOTES | ○ | ○ |
| ALL BLACK-KEY NOTES | ○ | × |

739

[NOTE TYPE COUNT CONDITION DATA]

| 10 OR MORE |
|---|

GAME PROCESS CONTROL METHOD, INFORMATION STORAGE MEDIUM, AND GAME DEVICE

Japanese Patent Application No. 2006-234163 filed on Aug. 30, 2006, is hereby incorporated by reference in its entirety.

BACKGROUND OF THE INVENTION

The present invention relates to a game device which executes a game in which a character appears and the like.

A game device has been known which includes a sound input means such as a microphone and utilizes sound input from the sound input means for a game process. For example, technology has been known which determines the parameter of a character caused to appear based on the input sound. According to this technology, the input sound (analog signal) is converted into a digital signal, and the digital signal is converted into a numerical value in frequency band units to create sequence data. Whether or not an arbitrary value in the sequence data coincides with predetermined reference data is determined, and the parameter of the character is determined based on the determination results (e.g. Japanese Patent No. 2860097).

According to the technology disclosed in Japanese Patent No. 2860097, the parameter of the character caused to appear is determined based on the input sound. However, this technology utilizes only part of the input sound, and causes a character having a parameter irrelevant to the meaning of the input sound to appear. Specifically, since the player cannot expect the relationship between the input sound and the parameter of the character to be generated, the parameter of the character is virtually determined at random. Therefore, the player may lose interest in sound input for determining the parameter of the character.

SUMMARY

According to one aspect of the invention, there is provided a game process control method which causes a computer including a sound input section to execute a game in which a game character appears, the method comprising:

detecting each note included in sound input from the sound input section;

analyzing the input sound based on the detected notes;

determining whether or not the analysis result coincides with an analysis result when analyzing a predetermined sound including a plurality of notes;

causing a new game character to appear when the analysis results have been determined to coincide; and controlling display of each game character including the new game character.

BRIEF DESCRIPTION OF THE SEVERAL VIEWS OF THE DRAWING

FIG. 7 shows an example of reference note data.

FIG. 8 shows an example of start reference note data.

FIG. 9 is a view illustrative of generation of note-name-unit reference data from reference note data.

FIG. 10 shows a data configuration example of level condition data.

FIG. 11 shows a data configuration example of note detection total count data.

FIG. 12 shows a data configuration example of similarity determination data.

FIG. 13 shows a data configuration example of similarity condition data.

FIG. 14 shows a data configuration example of note count condition data.

FIG. 15 shows a data configuration example of note count determination data.

DETAILED DESCRIPTION OF THE EMBODIMENT

Figure 1:
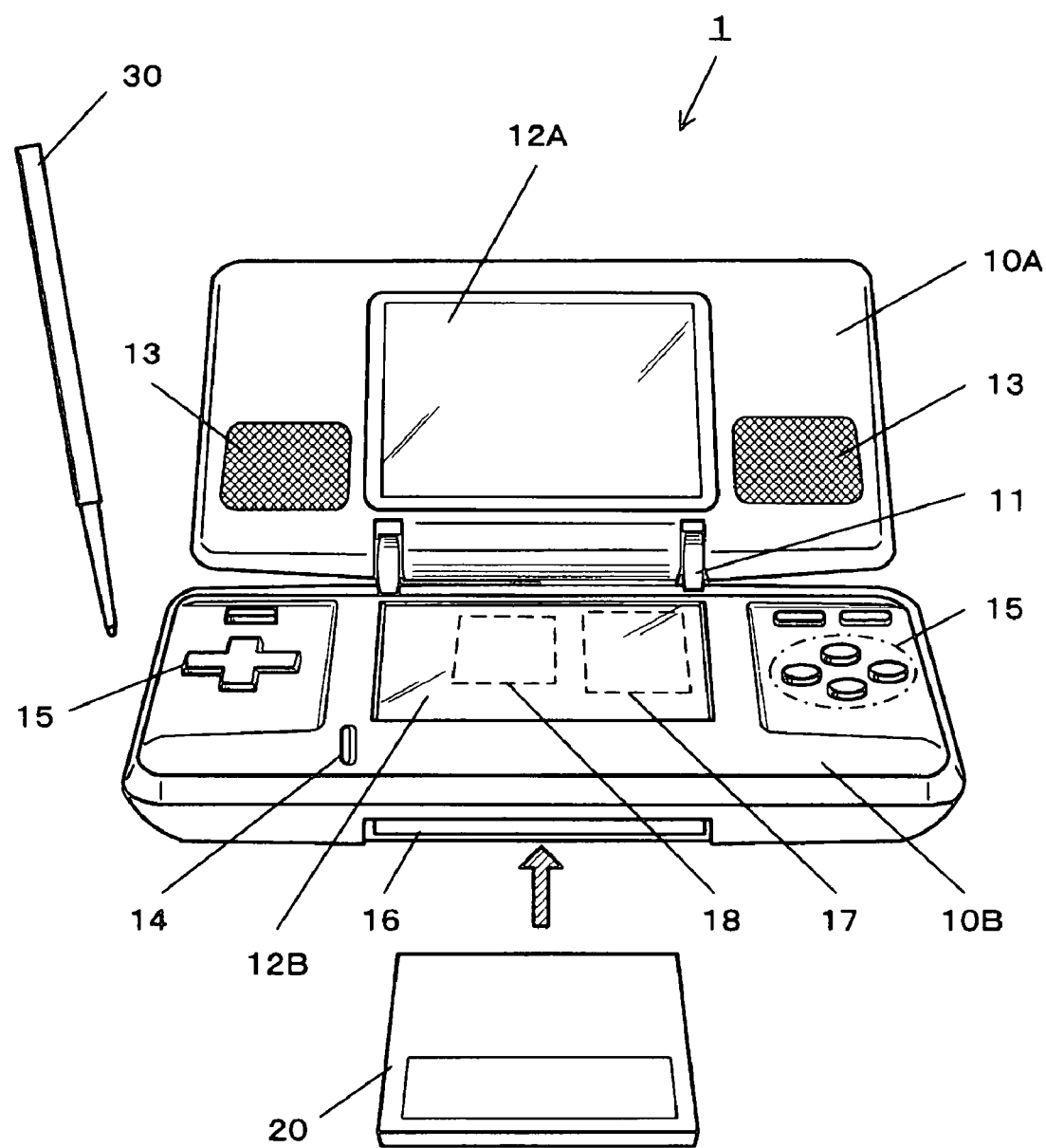
FIG. 1 shows an example of the outward appearance of a portable game device.

The invention may realize a novel method of processing input sound for causing a new game character to appear without causing a player to lose interest in sound input.

According to one embodiment of the invention, there is provided a game process control method which causes a computer including a sound input section to execute a game in which a game character appears, the method comprising:

detecting each note included in sound input from the sound input section;

analyzing the input sound based on the detected notes;

determining whether or not the analysis result coincides with an analysis result when analyzing a predetermined sound including a plurality of notes;

causing a new game character to appear when the analysis results have been determined to coincide; and controlling display of each game character including the new game character.

According to another embodiment of the invention, there is provided a game device comprising:

a sound input section;

a note detection section which detects each note included in sound input from the sound input section;

an analysis section which analyzes the input sound based on the notes detected by the note detection section;

a determination section which determines whether or not the analysis result of the analysis section coincides with an analysis result when the analysis section analyzes a predetermined sound including a plurality of notes; and a character appearance control section which causes a new game character to appear when the determination section has determined that the analysis results coincide.

According to the above embodiment, each note included in the input sound is detected. Whether or not the analysis result based on the detected notes coincides with the analysis result when analyzing the predetermined sound is determined, and a new character is caused to appear when the analysis results have been determined to coincide.

Specifically, a novel method of processing the input sound for causing a new game character to appear is realized in which the input sound is analyzed based on each note detected from the input sound, and a new game character is caused to appear based on the analysis results. Since the predetermined sound to be input is set in advance, and a new game character appears when the player inputs the predetermined sound, the player can easily determine the relationship between the input sound and the appearance of the game character. This makes it possible to increase the player's interest in sound input. Moreover, it becomes possible to flexibly determine whether or not the input sound coincides with the predetermined sound by appropriately specifying the condition for determining whether or not the input sound coincides with the predetermined sound, such as causing a new game character to appear even when the input sound does not completely coincide with the predetermined sound.

In the game process control method according to this embodiment, the notes included in the input sound may be detected at specific time intervals;

distribution of the notes included in the input sound with respect to passage of time may be analyzed based on the notes detected at the specific time intervals; and whether or not the analyzed distribution of the notes included in the input sound with respect to passage of time satisfies a note distribution condition indicating distribution of the notes included in the predetermined sound with respect to passage of time may be determined.

According to this feature, the distribution of the notes included in the input sound with respect to the passage of time is analyzed based on the notes detected from the input sound at specific time intervals, and whether or not the analysis result satisfies the note distribution condition indicating the distribution of the notes included in the predetermined sound with respect to the passage of time is determined. Specifically, whether or not to cause a new game character to appear is determined based on whether or not the input sound coincides with the predetermined sound as a whole. This makes it possible to flexibly determine whether or not the input sound coincides with the predetermined sound, such as causing a new game character to appear when the input sound almost coincides with the predetermined sound as a whole, even if the input sound partially differs from the predetermined sound.

In the game process control method according to this embodiment, the notes included in the input sound may be detected at specific time intervals;

a detection total count of each of the detected notes may be analyzed; and whether or not the analysis result of the detection total count satisfies a total count condition indicating a total count of each of the notes included in the predetermined sound may be determined.

According to this feature, the detection total count of each note detected from the input sound at specific time intervals is analyzed, and whether or not the analysis result satisfies the total count condition indicating the total count of each note included in the predetermined sound is determined. Specifically, whether or not the input sound coincides with the predetermined sound is determined based on the count of each note included in the input sound. This makes it possible to flexibly determine whether or not the input sound coincides with the predetermined sound, such as causing a new game character to appear when the player accurately plays the music specified as the predetermined sound irrespective of the tempo, for example.

The game process control method according to this embodiment may further comprise:

detecting an input start timing of consecutively input notes based on the detected notes;

wherein an input start timing of each of the notes included in the input sound may be analyzed based on the detected input start timing; and wherein whether or not the analysis result of the input start timing satisfies a timing condition indicating an input start timing of each of the notes included in the predetermined sound may be determined.

According to this feature, the input start timing of the consecutively input notes is detected, the input start timing of each note included in the input sound is analyzed based on the detected input start timing, and whether or not the analysis result satisfies the timing condition indicating the input start timing of each note included in the predetermined sound is determined. Specifically, whether or not the input sound coincides with the predetermined sound is determined based on the input start timing of each note included in the input sound. This makes it possible to flexibly determine whether or not the input sound coincides with the predetermined sound, such as causing a new game character to appear when the player inputs a specific note at a proper timing, even if the duration of the input of each note is wrong, for example.

In the game process control method according to this embodiment, the notes included in the input sound may be detected in note name units.

According to this feature, the notes included in the input sound are detected in note name units (i.e., regarding the notes having the same note name as those same notes). Specifically, since the notes are detected in note name units irrespective of the octave, the analysis result of the input sound is more easily determined to coincide with the analysis result of the predetermined sound, whereby a new character more easily appears.

In the game process control method according to this embodiment, the input sound may be subjected to a filtering process by detecting only the notes included in the input sound and having a specific intensity, and the notes included in the input sound subjected to the filtering process may be detected.

According to this feature, the input sound is subjected to the filtering process by detecting only the notes included in the input sound and having a specific intensity, and the notes included in the input sound subjected to the filtering process are detected. Specifically, a weak note which is included in the input sound and does not have a specific intensity is not detected.

The game process control method according to this embodiment may further comprise:

adjusting intensities of the notes included in the input sound at a single time and having a harmonic overtone relationship;

wherein the input sound of which a level of each note has been adjusted may be subjected to the filtering process.

According to this feature, the intensities of the notes included in the input sound at a single time and having a harmonic overtone relationship are adjusted, and the adjusted input sound is subjected to the filtering process.

In the game process control method according to this embodiment, a game character may be associated in advance with each of a plurality of predetermined sounds;

whether or not the analysis result of the input sound coincides with an analysis result of each of the predetermined sounds may be determined; and the game character corresponding to the predetermined sound of which the analysis result has been determined to coincide with the analysis result of the input sound may be caused to appear.

According to this feature, whether or not the analysis result of the input sound coincides with the analysis result of each of the predetermined sounds is determined, and a game character corresponding to the predetermined sound of which the analysis result has been determined to coincide with the analysis result of the input sound is caused to appear. Specifically, one of the game characters provided in advance and corresponding to the predetermined sound of which the analysis result has been determined to coincide with the analysis result of the input sound is caused to appear. Therefore, the game character caused to appears differs depending on the input sound, whereby the game playability can be increased.

In the game process control method according to this embodiment, a special character may be associated in advance with a time condition relating to date and/or time at which the special character can be caused to appear; and the special character may be caused to appear when date and/or time at which the input sound is input from the sound input section satisfies the time condition.

According to this feature, the special character is caused to appear when the date and/or the time at which the input sound is input satisfies the time condition associated with the special character in advance. This increases the game playability, such as causing a special game character to appear when the player inputs sound on a specific day such as Christmas or New Year's Day or at a specific time such as noon, for example.

The game process control method according to this embodiment may further comprise displaying a specific indication of the predetermined sound.

According to this feature, the indication of the predetermined sound is displayed. Specifically, the player can enjoy confirming the predetermined sound from the display and inputting the confirmed sound by displaying the indication (hint) of the predetermined sound. Examples of the indication of the predetermined sound include an indication of some or all of the notes (score) when the predetermined sound is a melody (music), an indication of an image of an object as a sound source when the predetermined sound is produced from an object such as an ambulance siren or cicada's song, and the like.

According to another embodiment of the invention, there is provided a computer-readable information recording medium storing a program for causing a computer to execute the above game process control method.

The term "information storage medium" used herein refers to a storage medium, such as a hard disk, an MO, a CD-ROM, a DVD, a memory card, or an IC memory, from which the stored information can be read by a computer.

According to the invention, a novel method of processing the input sound for causing a new game character to appear is realized in which the input sound is analyzed based on each note detected in the input sound, and a new game character is caused to appear based on the analysis result. Since the predetermined sound to be input is set in advance, and a new game character appears when the player inputs the predetermined sound, the player can easily determine the relationship between the input sound and the appearance of the game character. This makes it possible to increase the player's interest in sound input. Moreover, it becomes possible to flexibly determine whether or not the input sound coincides with the predetermined sound by appropriately specifying the condition for determining whether or not the input sound coincides with the predetermined sound, such as causing a new game character to appear even when the input sound does not completely coincide with the predetermined sound.

Preferred embodiments of the invention are described below with reference to the drawings. The following description illustrates an example of causing a portable game device to execute a breeding game. Note that the embodiment to which the invention can be applied is not limited thereto.

<Outward Appearance of Game Device>

FIG. 1 is a view showing an example of the outward appearance of a portable game device 1 according to this embodiment. As shown in FIG. 1, the portable game device 1 is a folding-type game device in which an upper housing 10A and a lower housing 10B are connected through a hinge 11 so that the portable game device 1 can be opened and shut. FIG. 1 illustrates the portable game device 1 in an open state (during use).

The inner sides of the housings 10A and 10B are provided with two displays 12A and 12B disposed on either side of the hinge 11 during use, a speaker 13, a microphone 14, various operation buttons 15, and the like. A touch panel is integrally formed in the display 12B over the entire display region. The touch panel detects a touch position in units of dots forming the display 12B according to a detection principle such as a pressure-sensitive method, an optical method, an electrostatic method, or an electromagnetic induction method, for example. The player can input various operations by utilizing a stylus pen 30 provided as an accessory, or by touching the display 12B.

Game information including a program and data necessary for the portable game device 1 to execute a game process and the like is stored in a cartridge 20 removable from a slot 16 formed in the side surface of the housing 10B. The portable game device 1 may connect with a wireless communication channel through a built-in wireless communication device 18 and acquires the game information from an external instrument.

The portable game device 1 includes a control device 17 including a CPU and an IC memory, the wireless communication device 18 for performing wireless communication conforming to a wireless LAN standard, a reading device for the cartridge 20, and the like. The CPU provided in the control device 17 executes various game processes based on a program and data read from the IC memory and the cartridge 20, a touch position detected by the touch panel, a sound signal input from the microphone 14, an operation signal input from the operation buttons 15, data received by the wireless communication device 18, and the like, and generates an image signal of a game screen and a sound signal of game sound. The CPU outputs the generated image signal to the displays 12A and 12B to cause the displays 12A and 12B to display a game screen, and outputs the generated sound signal to the speaker 13 to cause the speaker 13 to output game sound. The player enjoys the breeding game by operating the operation buttons 15 or touching the display 12B while watching the game screens displayed on the displays 12A and 12B.

<Outline of Game>

In the breeding game according to this embodiment, the player acquires an egg as one type of item during the game. The player causes a game character (hereinafter simply called "character") to be created (appear) by playing a melody for the egg, and rears the created character. The term "melody"

refers to a predetermined sound including a plurality of notes. The player can play a melody by inputting melody sound (music) through the microphone 14. Different types of eggs are provided which differ in outward appearance. Melody and a character are set for each type of egg. When the player plays a melody set for an egg, a character set for the egg is created. Specifically, the melody played by the player and the character to be created differ depending on the egg.

Figure 2:
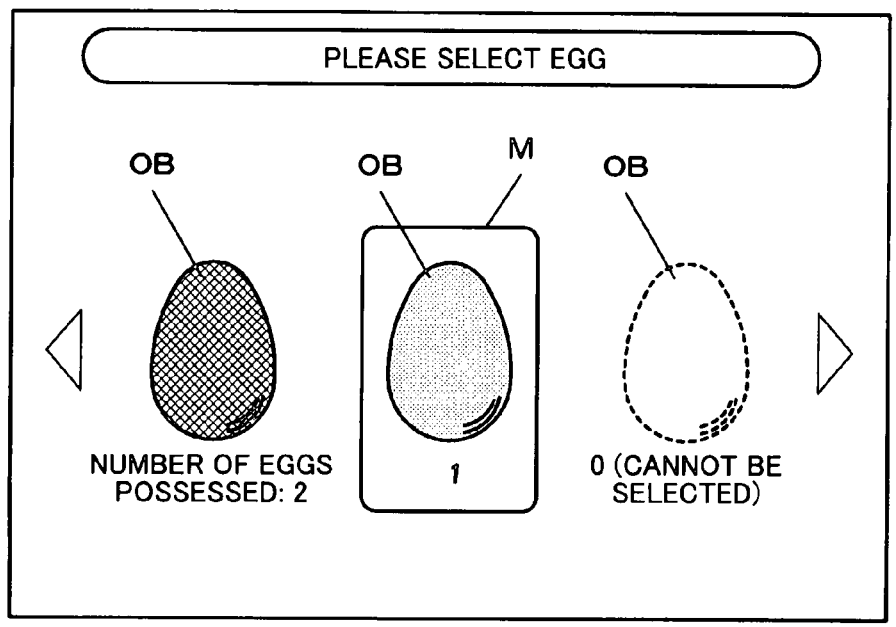
FIG. 2 shows an example of an egg selection screen.

In more detail, an egg selection screen for selecting an egg from which a character is created is displayed on the display 12B. FIG. 2 shows an example of the egg selection screen. In FIG. 2, different types of eggs OB provided in advance are listed on the egg selection screen together with the number of eggs currently possessed by the player. One of the eggs OB displayed is in a selected state. In FIG. 2, three of all types of eggs OB are displayed. The remaining eggs OB are displayed by scrolling the screen. Among the three eggs OB displayed, the egg OB at the center of the screen is in a selected state and enclosed by a frame M indicating the selected state.

Figure 3:
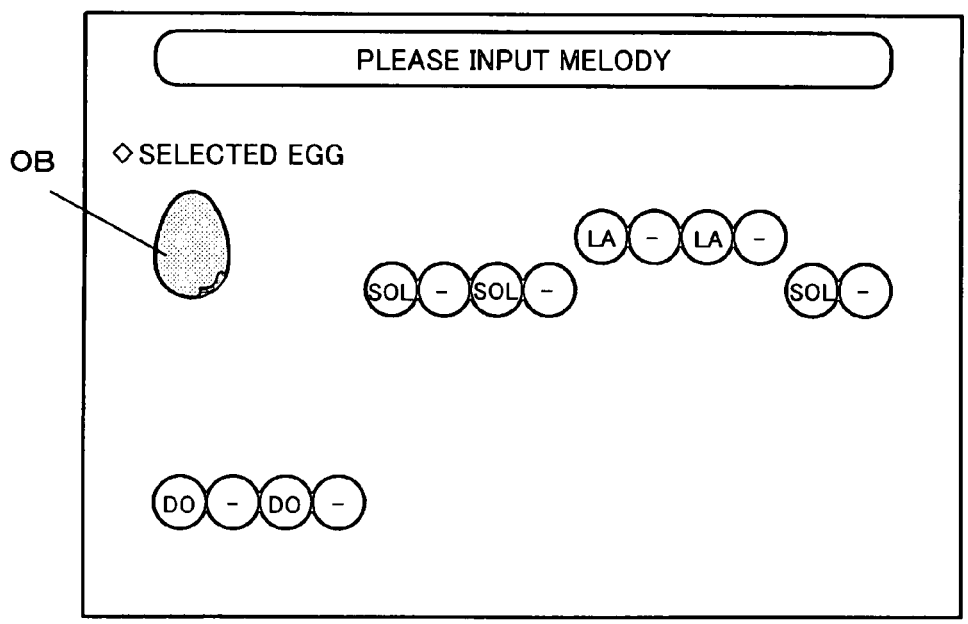
FIG. 3 shows an example of a melody input screen.

The player selects the desired egg on the egg selection screen. A melody input screen is then displayed for inputting a melody set for the selected egg. FIG. 3 shows an example of the melody input screen. In FIG. 3, the selected egg OB and the notes of the melody set for the selected egg OB are displayed on the melody input screen. The player inputs the melody sound through the microphone 14 by producing a sound or playing a musical instrument according to the displayed melody notes in accordance with a countdown instruction and the like subsequently displayed.

The portable game device 1 performs a specific analysis process for the input sound, and determines whether or not the input sound coincides with the melody set for the selected egg OB (hereinafter called "reference melody"). When the portable game device 1 has determined that the input sound coincides with the reference melody, the portable game device 1 causes a character set for the selected egg OB to be created. When the portable game device 1 has determined that the input sound does not coincide with the reference melody, the portable game device 1 determines that the player has failed in inputting the melody sound and does not cause the character to be created.

<Functional Configuration>

Figure 4:
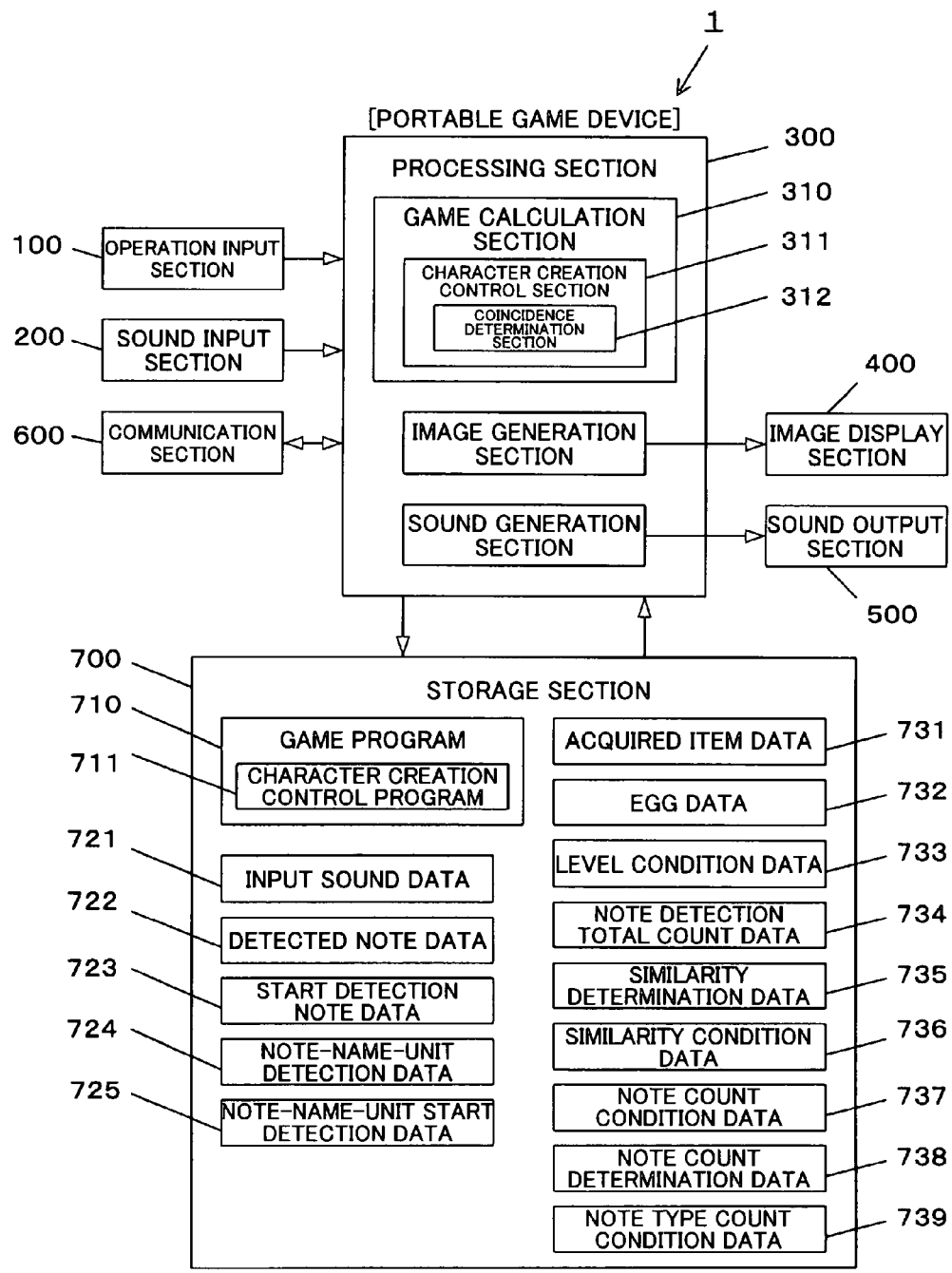
FIG. 4 is a functional configuration diagram of a portable game device.

FIG. 4 is a block diagram showing the functional configuration of the portable game device 1. In FIG. 4, the portable game device 1 is functionally configured to include an operation input section 100, a sound input section 200, a processing section 300, an image display section 400, a sound output section 500, a communication section 600, and a storage section 700.

The operation input section 100 receives an operation instruction input from the player, and outputs an operation signal corresponding to the operation to the processing section 300. The function of the operation input section 100 is implemented by a button switch, a lever, a dial, a mouse, a keyboard, various sensors, and the like. In FIG. 1, the operation button 15 and the touch panel integrally formed in the display 12B correspond to the operation input section 100.

The sound input section 200 collects sound such as voice input by the player, and outputs a sound signal corresponding to the collected sound to the processing section 300. The function of the sound output section 200 is implemented by a microphone or the like. In FIG. 1, the microphone 14 corresponds to the sound input section 200.

The processing section 300 controls the entire portable game device I and performs various calculations such as proceeding with the game and generating an image. The function of the processing section 300 is implemented by a calculation device such as a CPU (CISC or RISC) or an ASIC (e.g. gate array) and its control program, for example. In FIG. 1, the CPU provided in the control device 17 corresponds to the processing section 300.

The processing section 300 includes a game calculation section 310 which mainly performs game calculations, an image generation section 330 which generates a game image based on various types of data calculated by the game calculation section 310, and a sound generation section 340 which generates game sound such as effect sound and background music (BGM).

The game calculation section 310 performs various game processes based on the operation signal input from the operation input section 100, the sound signal input from the sound input section 200, a program and data read from the storage section 700, and the like. In this embodiment, the game calculation section 310 includes a character creation control section 311, and realizes the breeding game by performing a game process based on a game program 710.

The character creation control section 311 includes a coincidence determination section 312, and performs a process relating to the creation of a character. Specifically, the character creation control section 311 refers to possessed item data 731, and causes the image display section 400 to display the egg selection screen in which different types of eggs provided in advance are displayed together with the number of eggs currently possessed by the player, as shown in FIG. 2, for example.

Figure 5:
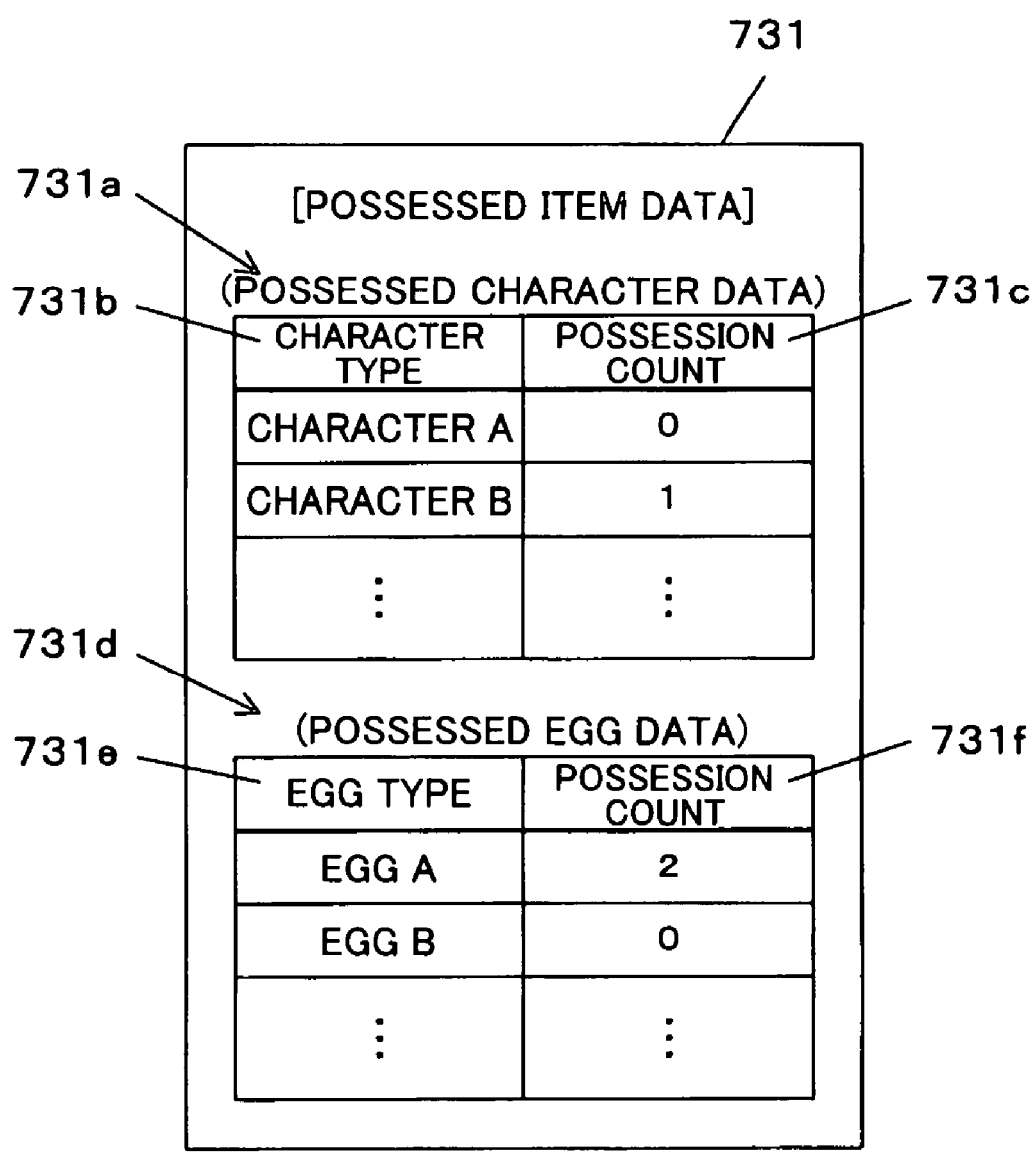
FIG. 5 shows a data configuration example of possessed item data.

The possessed item data 731 is data relating to the currently possessed items. FIG. 5 shows an example of the data configuration of the possessed item data 731. As shown in FIG. 5, the possessed item data 731 includes possessed character data 731a and possessed egg data 731d. The possessed character data 731a is data relating to the possession of characters, in which a character type 731b and a possession count 731c are stored while being associated with each other. The possessed egg data 731d is data relating to the possession of eggs, in which an egg type 731e and a possession count 731f are stored while being associated with each other.

When the player has selected an egg on the egg selection screen, the character creation control section 311 refers to egg data 732 corresponding to the selected egg, and causes the image display section 400 to display the melody input screen showing the reference melody set for the selected egg, as shown in FIG. 3, for example.

Figure 6:
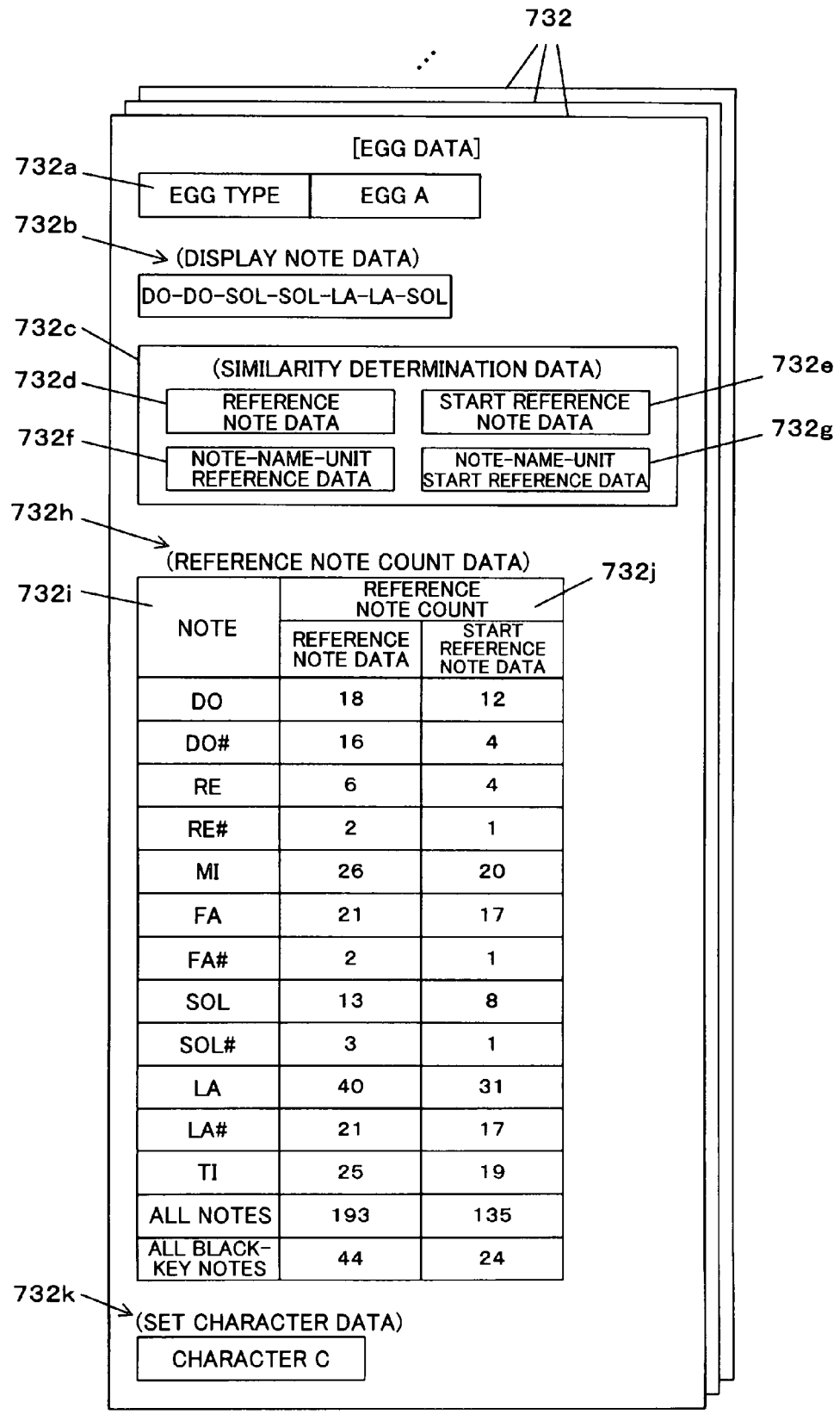
FIG. 6 shows a data configuration example of egg data.

The egg data 732 is a data table relating to the reference melody and the character set for each egg. FIG. 6 shows an example of the data configuration of the egg data 732. As shown in FIG. 6, the egg data 732 is provided for each egg type. The egg data 732 includes (stores) a corresponding egg type 732a, display note data 732b, similarity determination data 732c, reference note count data 732h, and set character data 732k.

The display note data 732b is display data indicating the reference melody set for the egg, and stores the notes of the reference melody.

The similarity determination data 732c is one of predetermined sound conditions for determining the coincidence between the reference melody set for the egg and the input sound. The similarity determination data 732c is a note distribution condition which is the distribution of the notes included in the reference melody with respect to the passage of time. The similarity determination data 732c includes reference note data 732d, start reference note data 732e, note-name-unit reference data 732f, and note-name-unit start reference data 732g.

The reference note data 732*d* is data obtained by detecting the notes within a specific octave range (e.g. three octaves) from the melody set for the egg at specific time intervals (e.g. intervals of ⅛ seconds). The notes are within a specific octave range (e.g. three octaves) of which one octave includes "do", "do#", "re" "re#", "mi", "fa", "fa#", "sol", "sol#", "la", "la#", "ti" (12 notes in total). These 12 notes are called note names.

FIG. 7 shows an example of the data configuration of the reference note data 732*d*. As shown in FIG. 7, whether or not each note 732*d*-2 is included is stored as the reference note data 732*d* in units of time 732*d*-1 at specific time intervals. In FIG. 7, "O" indicates that the note 732*d*-2 is included, and "x" indicates that the note 732*d*-2 is not included.

The start reference note data 732*e* is data of the note in the reference note data 732*d* which has been determined to be the start (input timing), i.e., data of the start of each note included in the reference melody. The term "start" refers to the timing at which the input of the note starts. For example, when the note "do" is consecutively input for several seconds, the start timing of the consecutive input is the start (input timing) of the note "do". When the note "do" is intermittently input, the start timing of each input is determined to be the start.

FIG. 8 shows an example of the data configuration of the start reference note data 732*e*. As shown in FIG. 8, the start reference note data 732*e* indicates whether or not each note 732*e*-2 is the start note in units of time 732*e*-1 in the same manner as the reference note data 732*d*. In FIG. 8, "O" indicates that the note is the start note, and "x" indicates that the note is not the start note.

The note-name-unit reference data 732*f* is data obtained by combining the notes included in the reference note data 732*d* within one octave in note name units. As shown in FIG. 9, the note-name-unit reference data 732*f* is data obtained by combining the notes included in the reference note data 732*d* within one octave in note name units in units of time t irrespective of the octave.

The note-name-unit start reference data 732*g* is data obtained by combining the notes included in the start reference note data 732*e* within one octave in note name units in the same manner as the note-name-unit reference data 732*f*.

In FIG. 6, the reference note count data 732*h* is one of the predetermined sound conditions for determining the coincidence between the reference melody set for the egg and the input sound. The reference note count data 732*h* is a total count condition which is a condition of the total count of each note included in the reference melody. A reference note count 732*j*, which is the total count of each note included in the reference note data 732*d* and the start reference note data 732*e*, is stored as the reference note count data 732*h* while being associated with each note 732*i*. The notes 732*i* include 12 notes "do" to "ti", all the notes including all of the 12 notes, and all the black-key notes including all of the black-key notes. The black-key note refers to a note to which sharp "#" is attached. In this example, the black-key notes include "do#", "re#", "fa#", "sol#", and "la#" (five notes in total). The reference note count of all the notes is the sum of the reference note counts of the notes "do" to "ti", and the reference note count of all the black-key notes is the sum of the reference note counts of the black-key notes. The reference note count 732*j* is obtained by counting the notes having the same name as those same notes irrespective of the octave.

The set character data 732*k* is data of the character set for the egg OB. The corresponding character type is stored as the set character data 732*k*.

The character creation control section 311 causes the image display section 400 to display the melody input screen showing the notes of the reference melody set for the selected egg according to the display note data 732*b* of the egg data 732 corresponding to the selected egg. After completion of a specific countdown display and the like, the character creation control section 311 starts to record the input sound. Specifically, the character creation control section 311 converts the input sound from the sound input section 200 into a digital signal, and stores the digital signal in the storage section 700 as input sound data 721.

After completion of recording, the coincidence determination section 312 performs a specific analysis process for the input sound data 721, and determines whether or not the input sound data 721 coincides with the reference melody set for the selected egg OB.

Specifically, the coincidence determination section 312 detects the notes within a specific octave range from the input sound data 721 at specific time intervals. The detection time interval and the detection octave range are respectively the same as the time interval (e.g. interval of ⅛ seconds) and the octave range (e.g. three octaves) used to generate the reference note data 732*d*. The note detection results are stored as detected note data 722. Specifically, the presence or absence of detection of each note is stored as the detected note data 722 in units of detection time t at specific time intervals in the same manner as the reference note data 732*d* of which the example is shown in FIG. 7.

The coincidence determination section 312 determines the detected notes in the detected note data 722 in units of detection time t. When notes having a harmonic overtone relationship are included in the notes, the coincidence determination section 312 adjusts the levels of the notes having a harmonic overtone relationship. Specifically, the coincidence determination section 312 reduces the level (sound intensity) of one of the notes having a harmonic overtone relationship and included within a higher octave (e.g. reduces the level by 30%).

The coincidence determination section 312 determines the maximum level of the detected notes. The coincidence determination section 312 excludes the note which is included in the detected note data 722 and does not satisfy a specific level condition from the detected notes.

The level condition is stored as level condition data 733. FIG. 10 shows an example of the data configuration of the level condition data 733. As shown in FIG. 10, the level condition of the note with respect to the maximum level of the detected note is stored as the level condition data 733.

The coincidence determination section 312 calculates the total count (detection total count) of each note detected based on the detected note data 722. The coincidence determination section 312 counts the notes having the same name as those same notes irrespective of the octave. The coincidence determination section 312 sums up the detection total count of each note to calculate the detection total count of all the notes. The coincidence determination section 312 sums up the detection total count of each black-key note to calculate the detection total count of all the black-key notes.

The calculated detection total count is stored as note detection total count data 734. FIG. 11 shows an example of the data configuration of the note detection total count data 734. As shown in FIG. 11, detection total counts 734*b* of the detected note data 722 and the detected note data 723 are stored as the note detection total count data 734 while being associated with each note 734*a*. The notes 734*a* include 12 notes "do" to "ti", all the notes, and all the black-key notes.

The coincidence determination section 312 determines the start (input timing) of the detected note based on the detected note data 722. Specifically, when each note in the detected note data 722 satisfies one of the following conditions A1 to A3, the coincidence determination section 312 determines that note to be the start.

Condition A1: the note has not been detected at the preceding detection time $t_{-1}$ and is not detected at the subsequent detection time $t_{+1}$, and the level of the note detected at the present detection time t is 93% or more of the maximum level.

Condition A2: the note has not been detected at the preceding detection time $t_{-1}$ but is detected at the subsequent detection time $t_{+1}$, and the level of the note detected at the subsequent detection time $t_{+1}$ is higher than the level of the note detected at the present detection time t.

Condition A3: the note has not been detected at the preceding detection time $t_{-1}$ but is detected at the subsequent detection time $t_{+1}$, and the level of the note detected at the subsequent detection time $t_{+1}$ is lower than the level of the note detected at the present detection time t.

The start determination results are stored as the start detection note data 722. Specifically, whether or not each note is the start note is stored as the start detection note data 722 in units of detection time t in the same manner as the start reference note data 732e of which the example is shown in FIG. 8.

The coincidence determination section 312 combines the detected note data 722 which is data over several octaves within one octave in note name units to generate note-name-unit detection data 724. Likewise, the coincidence determination section 312 combines the start detection note data 723 within one octave in note name units to generate note-name-unit start detection data 725.

The coincidence determination section 312 then determines whether or not the input sound coincides with the reference melody set for the selected egg. Specifically, the coincidence determination section 312 refers to the egg data 732 corresponding to the selected egg, and determines whether or not the input sound coincides with the reference melody by (1) determining the distribution of the notes detected from the input sound based on the similarity determination data 732c or (2) determining the detection total count of each note detected from the input sound based on the reference note count data 732h.

The coincidence determination section 312 determines the distribution of the notes detected from the input sound as follows. Specifically, the coincidence determination section 312 calculates the degree of similarity between the detected note data 722 included in the similarity determination data 732c and the reference note data 732d by known pattern matching or the like. The coincidence determination section 312 calculates the degree of similarity in the range from "0.0" indicating a complete mismatch to "1.0" indicating a complete match. Likewise, the coincidence determination section 312 calculates the degree of similarity between the start detection note data 723 and the start reference note data 732e, the degree of similarity between the note-name-unit detection data 724 and the note-name-unit reference data 732f, and the degree of similarity between the note-name-unit start detection data 725 and the note-name-unit start reference data 732g. The coincidence determination section 312 averages the calculated four degrees of similarity.

The calculated degrees of similarity are stored as similarity determination data 735. FIG. 12 shows an example of the data configuration of the similarity determination data 735. As shown in FIG. 12, a data type 735a and a calculated degree of similarity 735b are stored as the similarity determination data 735 while being associated with each other. The data type 735a includes the detected note data 722, the start detection note data 723, the note-name-unit detection data 724, the note-name-unit start detection data 725, and the average value.

When the calculated average degree of similarity satisfies a specific similarity condition, the coincidence determination section 312 determines that the input sound coincides with the reference melody.

The similarity condition is stored as similarity condition data 736. FIG. 13 shows an example of the data configuration of the similarity condition data 736. As shown in FIG. 13, a similarity condition whereby the input sound is determined to coincide with the reference melody is stored as the similarity condition data 736.

The coincidence determination section 312 determines the detection total count of each note detected from the input sound as follows. Specifically, the coincidence determination section 312 refers to the note detection total count data 734, and determines whether or not the detection total count of each note in the detected note data 722 satisfies a specific note count condition with respect to the reference note count specified by the reference note count data 732h. Likewise, the coincidence determination section 312 refers to the note detection total count data 734, and determines whether or not the detection total count of each note in the start detection note data 723 satisfies a specific note count condition with respect to the reference note count specified by the reference note count data 732h.

The note count condition is stored as note count condition data 737. FIG. 14 shows an example of the data configuration of the note count condition data 737. As shown in FIG. 14, a note type 737a and a note count condition 737b are stored as the note count condition data 737 while being associated with each other. The note type 737a includes 12 notes "do" to "ti", all the notes, and all the black-key notes. The percentage of the detection total count with respect to the reference note count is stored as the note count condition 737b.

The determination results are stored as note count determination data 738. FIG. 15 shows an example of the data configuration of the note count determination data 738. As shown in FIG. 15, a note 738a and determination results 738b of the detected note data 722 and the start detection note data 723 are stored as the note count determination data 738 while being associated with one another. The notes 738a include 12 notes "do" to "ti", all the notes, and all the black-key notes. "O" indicating that the note count condition is satisfied and "x" indicating that the note count condition is not satisfied are stored as the determination results 738b.

The coincidence determination section 312 then refers to the note count determination data 738, and calculates the number of types of notes determined to satisfy the note count condition for each of the detected note data 722 and the start detection note data 723. When the calculated number of types of notes satisfies a specific note type count condition, the coincidence determination section 312 determines that the input sound coincides with the reference melody.

Figure 16:
FIG. 16 shows a data configuration example of note type count condition data.

The note type count condition is stored as note type count condition data 739. FIG. 16 shows an example of the data configuration of the note type count condition data 739. As shown in FIG. 16, a note type count condition whereby the input sound is determined to coincide with the reference melody is stored as the note type count condition data 739.

In FIG. 4, the image generation section 330 generates a game image for displaying a game screen based on the calculation results from the game calculation section 310, and outputs an image signal of the generated image to the image display section 400. The image display section 400 displays the game screen based on the image signal from the image generation section 330 while redrawing the screen of one frame every 1/60 second, for example. The function of the image display section 400 is implemented by hardware such as a CRT, an LCD, an ELD, a PDP, or an HMD. In FIG. 1, the displays 12A and 12B correspond to the image display section 400.

The sound generation section 340 generates game sound such as effect sound and BGM used during the game, and outputs a sound signal of the generated game sound to the sound output section 500. The sound output section 500 outputs the game sound such as effect sound and BGM based on the sound signal from the sound generation section 340. The function of the sound output section 500 is implemented by a speaker or the like. In FIG. 1, the speaker 13 corresponds to the sound output section 500.

The communication section 600 performs data communication with an external device such as another portable game device 1 according to the control signal from the processing section 300. The function of the communication section 600 is implemented by a wireless communication module, a jack for a communication cable, a control circuit, or the like. In FIG. 1, the wireless communication device 18 corresponds to the communication section 600.

The storage section 700 stores a system program for implementing the function for causing the processing section 300 to integrally control the portable game device 1, a program and data necessary for causing the processing section 300 to execute the game, and the like. The storage section 700 is used as a work area for the processing section 300, and temporarily stores the results of calculations performed by the processing section 300 according to various programs, data input from the operation input section 100, and the like. The function of the storage section 700 is implemented by an IC memory, a hard disk, a CD-ROM, a DVD, an MO, a RAM, a VRAM, or the like. In FIG. 1, the ROM, the RAM, and the like provided in the control device 17 correspond to the storage section 700.

The storage section 700 also stores the game program 710 for causing the processing section 300 to function as the game calculation section 310, and game data. The game program 710 includes a character creation control program 711 for causing the processing section 300 to function as the character creation control section 311. The game data includes the input sound data 721, the detected note data 722, the start detection note data 723, the note-name-unit detection data 724, the note-name-unit start detection data 725, the possessed item data 731, the egg data 732, the level condition data 733, the note detection total count data 734, the similarity determination data 735, the similarity condition data 736, the note count condition data 737, the note count determination data 738, and the note type count condition data 739.

<Process Flow>

Figure 17:
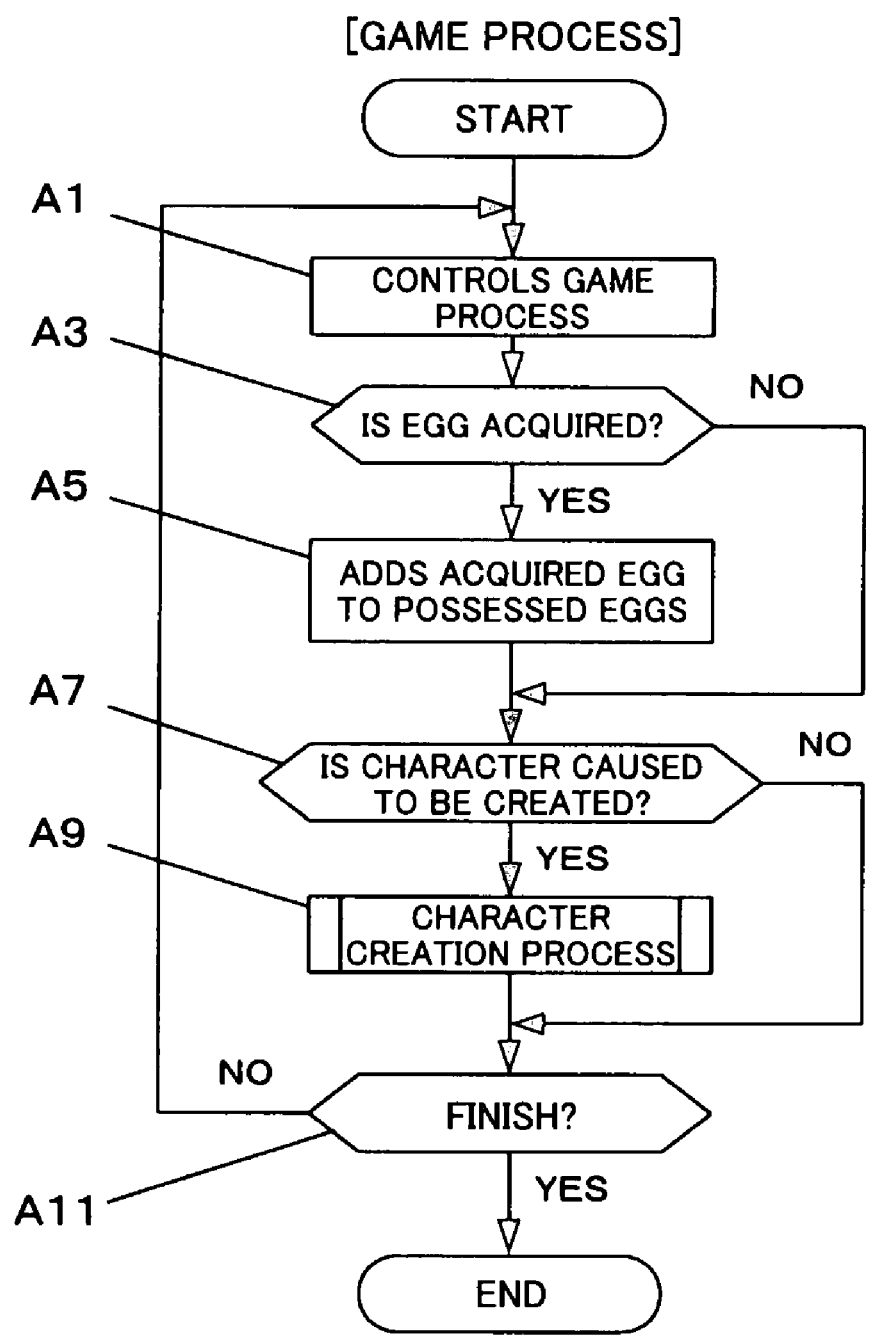
FIG. 17 is a flowchart of a game process.

FIG. 17 is a flowchart illustrative of the flow of the game process according to this embodiment. This process is implemented by causing the game calculation section 310 to execute the game program 710. As shown in FIG. 17, the game calculation section 310 controls the process of a known breeding game according to the operation input from the operation input section 100 and the like (step A1). When the player has acquired a new egg (step A3: YES), the game calculation section 310 adds the acquired egg to the possessed eggs to update the possessed egg data 731d (step A5). When causing a character to be created (step A7: YES), the character creation control section 311 performs a character creation process (step A9).

Figure 18:
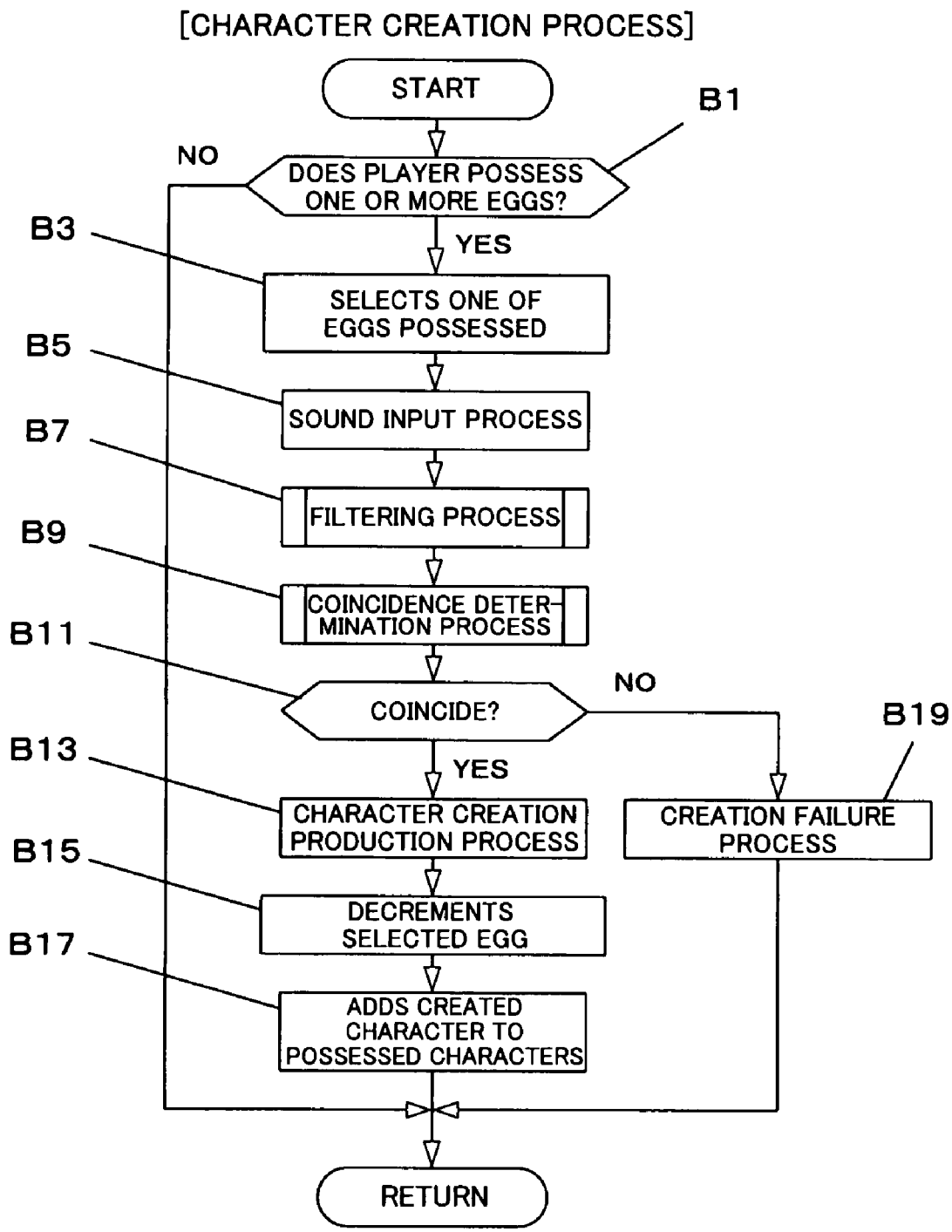
FIG. 18 is a flowchart of a character creation process executed during the game process.

FIG. 18 is a flowchart illustrative of the flow of the character creation process. As shown in FIG. 18, the character creation control section 311 determines whether or not the player currently possesses one or more eggs referring to the possessed egg data 731d. When the player currently possesses one or more eggs (step B1: YES), the character creation control section 311 causes the image display section 400 to display the egg selection screen in which different types of eggs provided in advance are displayed together with the number of eggs possessed by the player. The character creation control section 311 selects one of the eggs possessed by the player according to the operation input from the operation input section 100 (step B3).

When the egg has been selected, the character creation control section 311 performs a sound input process of allowing the player to input melody sound by performing a specific countdown display and the like, and storing sound data input from the sound input section 200 as the input sound data 721 (step B5). The coincidence determination section 312 then performs a filtering process for the input sound data 721 (step B7).

Figure 19:
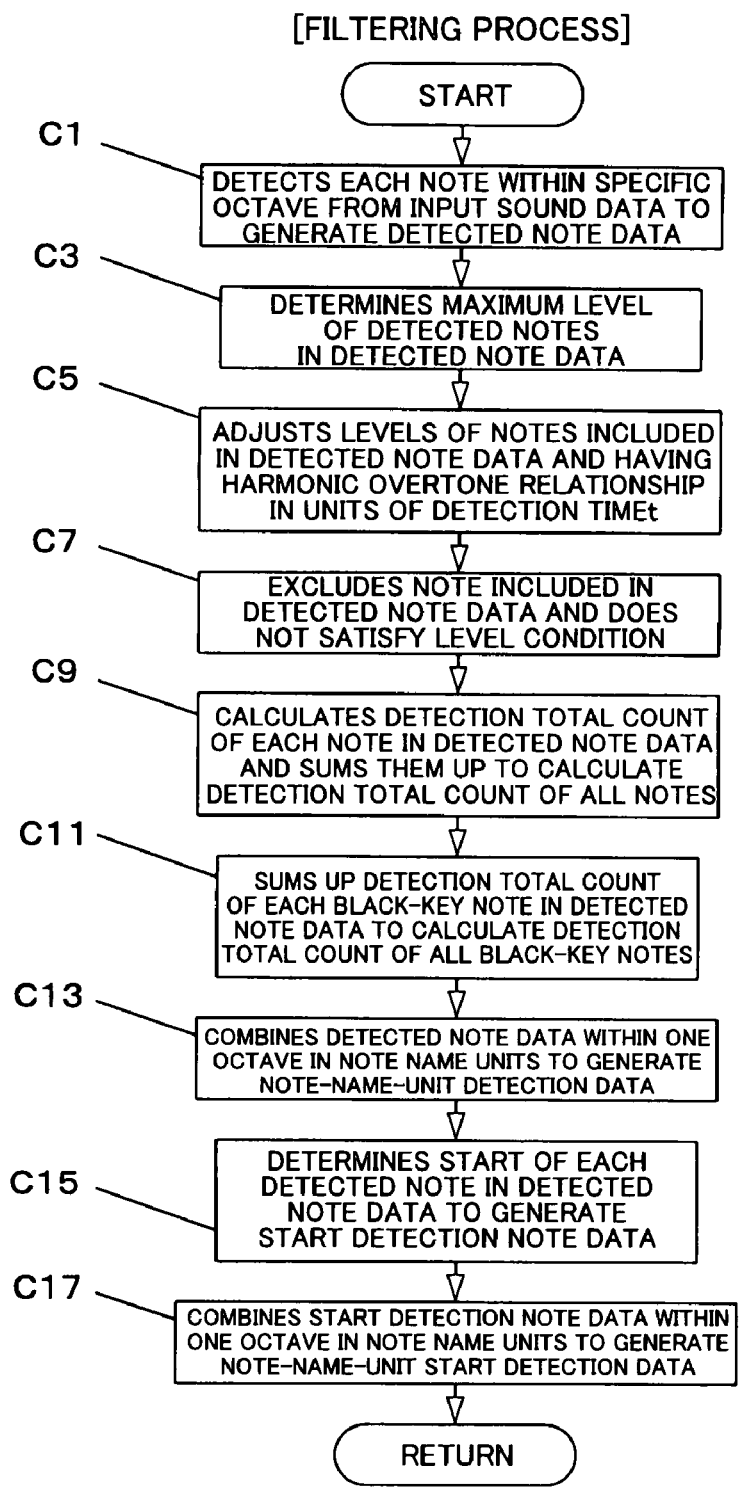
FIG. 19 is a flowchart of a filtering process executed during the character creation process.

FIG. 19 is a flowchart illustrative of the flow of the filtering process. As shown in FIG. 19, the coincidence determination section 312 detects each note within a specific octave from the input sound data 721, and generates the detected note data 722 (step C1). The coincidence determination section 312 determines the maximum level of the detected note based on the detected note data 722 (step C3). The coincidence determination section 312 determines the detected notes in the detected note data 722 in units of detection time t. When notes having a harmonic overtone relationship are included, the coincidence determination section 312 adjusts the levels of the notes having a harmonic overtone relationship (step C5). The coincidence determination section 312 refers to the level condition data 733, and excludes any note in the detected note data 722 which does not satisfy the specific level condition from the detected notes (step C7).

The coincidence determination section 312 calculates the detection total count of each note in the detected note data 722, and sums up the calculated detection total count of each note to calculate the detection total count of all the notes (step C9). The coincidence determination section 312 sums up the detection total count of each black-key note in the detected note data 722 to calculate the detection total count of all the black-key notes (step C11).

The coincidence determination section 312 combines the detected note data 722 within one octave in note name units to generate the note-name-unit detection data 724 (step C13). The coincidence determination section 312 determines the start of each detected note in the detected note data 722 to generate the start detection note data 723 (step C15). The coincidence determination section 312 combines the start detection note data 723 within one octave in note name units to generate the note-name-unit start detection data 725 (step C17).

The coincidence determination section 312 thus completes the filtering process.

After the completion of the filtering process, the coincidence determination section 312 performs a coincidence determination process (step B9).

Figure 20:
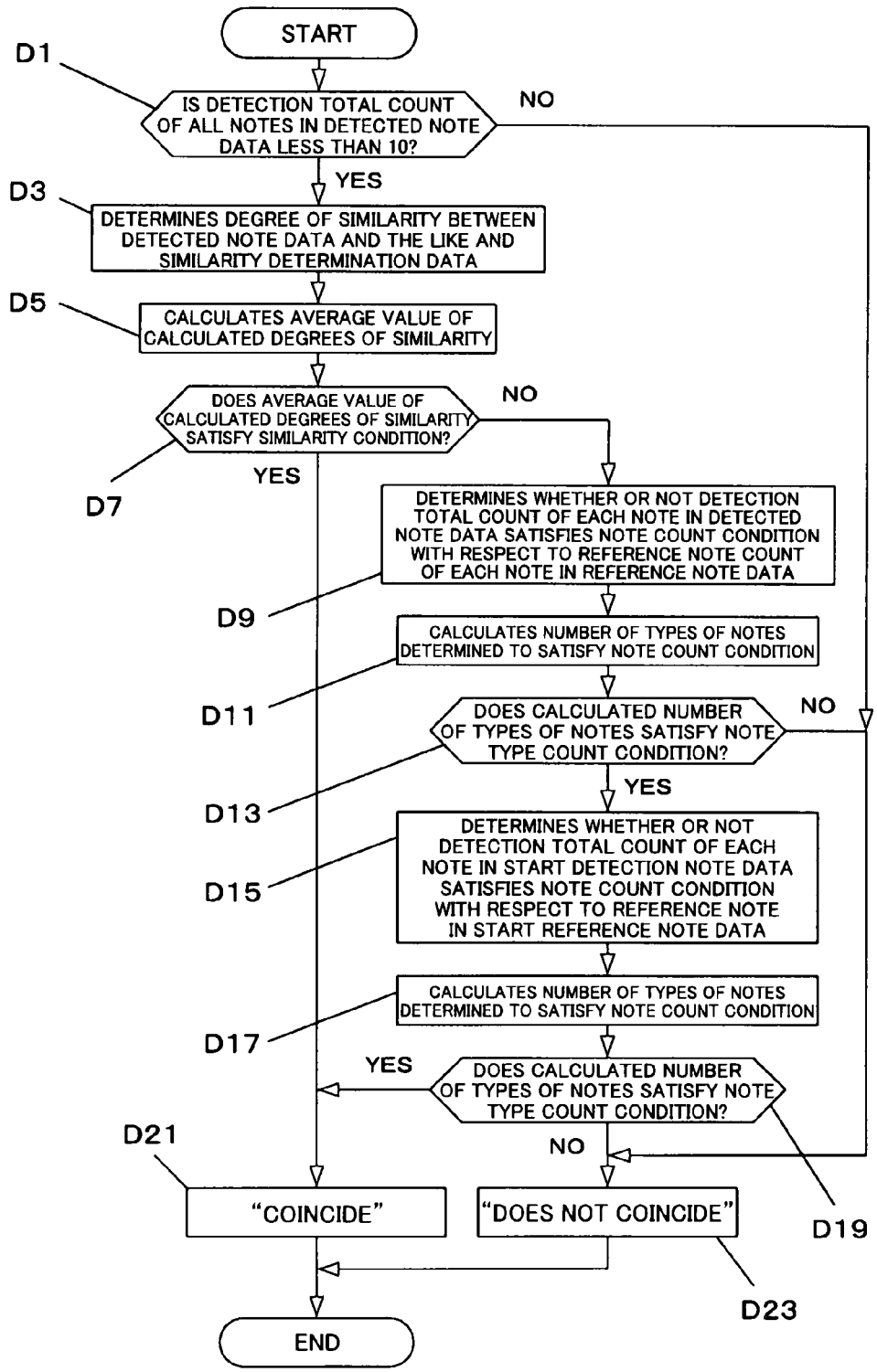
FIG. 20 is a flowchart of a coincidence determination process executed during the character creation process.

FIG. 20 is a flowchart illustrative of the flow of the coincidence determination process. As shown in FIG. 20, the coincidence determination section 312 refers to the note detection total count data 734, and determines the detection total count of all the notes in the detected note data 722. When the detection total count of all the notes is less than 10 (step D1: NO), the coincidence determination section 312 determines that the input sound does not coincide with the reference melody (step D23).

When the detection total count of all the notes is 10 or more (step D1: YES), the coincidence determination section 312 refers to the corresponding egg data 732, and calculates the degree of similarity between the detected note data 722 and the reference note data 732d, the degree of similarity between the start detection note data 723 and the start reference note data 732e, the degree of similarity between the note-name-unit detection data 724 and the note-name-unit reference data 732f, and the degree of similarity between the note-name-unit start detection data 725 and the note-name-unit start reference data 732g (step D3). The coincidence determination section 312 calculates the average value of the calculated degrees of similarity (step D5). The coincidence determination section 312 determines whether or not the calculated degree of similarity satisfies the similarity condition specified by the similarity condition data 736. When the calculated degree of similarity satisfies the similarity condition (step D7: YES), the coincidence determination section 312 determines that the input sound coincides with the reference melody (step D21).

When the calculated degree of similarity does not satisfy the similarity condition (step D7: NO), the coincidence determination section 312 refers to the corresponding egg data 732, determines whether or not the detection total count of each note in the detected note data 722 satisfies the note count condition specified by the note count condition data 737 with respect to the reference note count of each note in the reference note data 732d (step D9), and calculates the number of types of notes determined to satisfy the note count condition (step D11). The coincidence determination section 312 determines whether or not the calculated number of types of notes satisfies the note type count condition specified by the note type count condition data 739. When the calculated number of types of notes does not satisfy the note type count condition (step D13: NO), the coincidence determination section 312 determines that the input sound does not coincide with the reference melody (step D23).

When the calculated number of types of notes satisfies the note type count condition (step D13: YES), the coincidence determination section 312 determines whether or not the detection total count of each note in the start detection note data 723 satisfies the note count condition specified by the note count condition data 737 with respect to the reference note count of each note in the start reference note data 732e (step D15), and calculates the number of types of notes determined to satisfy the note count condition (step D17). The coincidence determination section 312 determines whether or not the calculated number of types of notes satisfies the note type count condition specified by the note type count condition data 739.

When the calculated number of types of notes satisfies the note type count condition (step D19: NO), the coincidence determination section 312 determines that the input sound coincides with the reference melody (step D21). When the calculated number of types of notes does not satisfy the note type count condition (step D19: NO), the coincidence determination section 312 determines that the input sound does not coincide with the reference melody (step D23).

The coincidence determination section 312 thus completes the coincidence determination process.

After the completion of the coincidence determination process, when the coincidence determination section 312 has determined that the input sound coincides with the reference melody (step B11: YES), the coincidence determination section 312 performs a character creation production process of causing the image display section 400 to display a character creation screen showing a state in which a character is created from the selected egg, and causing the sound output section 500 to output specific production sound, for example (step B13). The coincidence determination section 312 decrements (reduces) the eggs of the selected type by one to update the egg data 731d (step B15), and adds the created character to the possessed characters to update the possessed character data 731a (step B17).

When the coincidence determination section 312 has determined that the input sound does not coincide with the reference melody in the step B11 (step B11: NO), the coincidence determination section 312 performs a character creation failure process of causing the image display section 400 to display a creation failure screen indicating failure of the creation of a character, and causing the sound output section 500 to output specific production sound, for example (step B19).

The character creation control section 311 thus completes the character creation process.

After the completion of the character creation process, the game calculation section 310 determines whether or not to finish the game. When the game calculation section 310 does not finish the game (step A11: NO), the game calculation section 310 transitions to the step A1. When the game calculation section 310 has determined to finish the game (step A11: YES), the game calculation section 310 finishes the game process to finish the game.

<Hardware Configuration>

Figure 21:
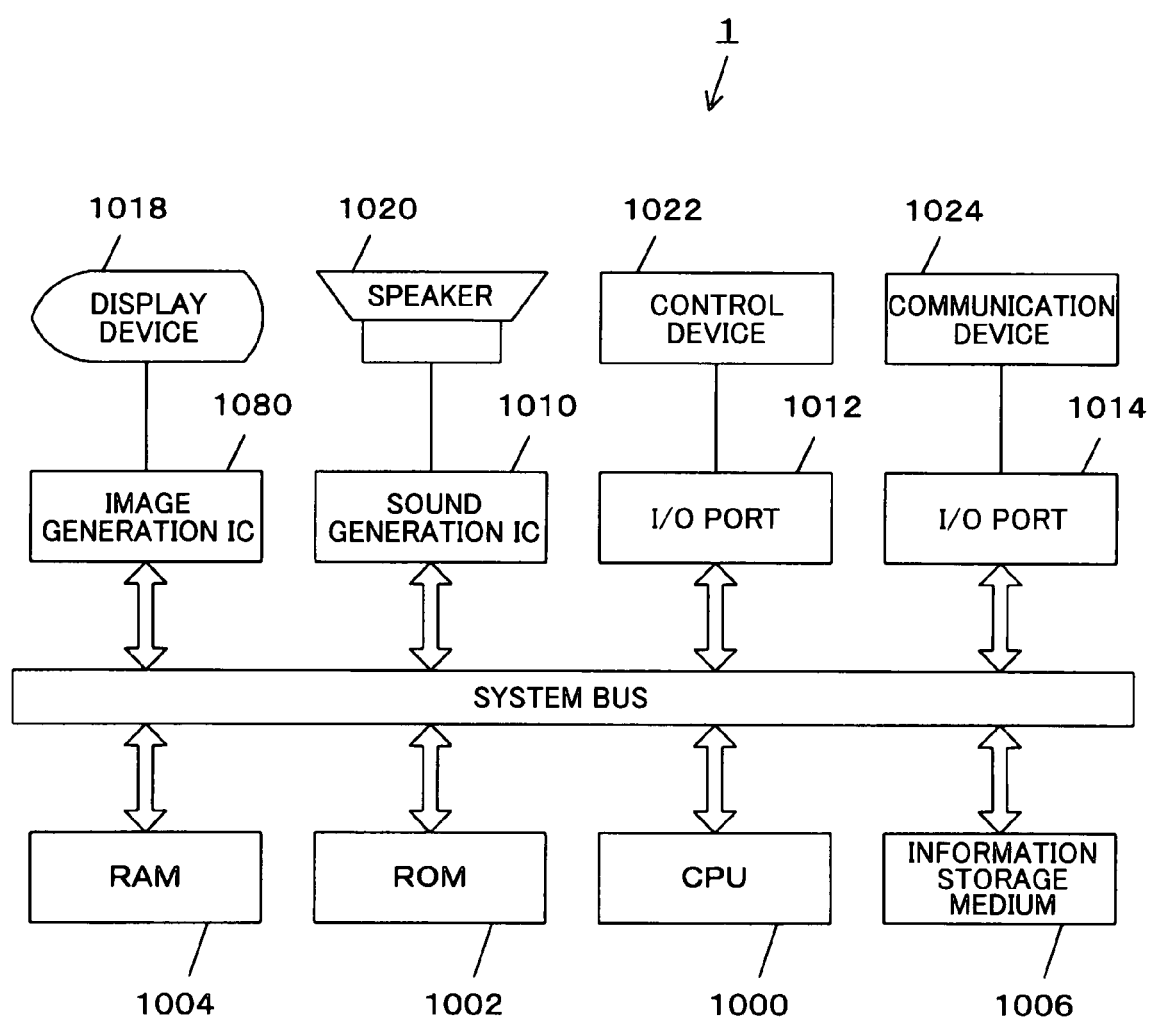
FIG. 21 shows a hardware configuration example of a portable game device.

FIG. 21 is a view showing an example of the hardware configuration of the portable game device 1 according to this embodiment. As shown in FIG. 21, the portable game device 1 includes a CPU 1000, a ROM 1002, a RAM 1004, an information storage medium 1006, an image generation IC 1008, a sound generation IC 1010, and I/O ports 1012 and 1014. These sections are connected so that data can be input and output through a system bus 1016. A display device 1018 is connected with the image generation IC 1008. A speaker 1020 is connected with the sound generation IC 1010. A control device 1022 is connected with the I/O port 1012. A communication device 1215 is connected with the I/O port 1014.

The CPU 1000 controls the entire device and performs various data processes according to a program and data stored in the information storage medium 1006, a system program (e.g. initialization information of the device main body) and data stored in the ROM 1002, a signal input from the control device 1022, and the like. The CPU 1000 corresponds to the CPU provided in the control device 17 shown in FIG. 1 and the processing section 300 shown in FIG. 4.

The ROM 1002, the RAM 1004, and the information storage medium 1006 correspond to the storage section 700 shown in FIG. 4. The ROM 1002 stores a predetermined program, data, and the like among the system program of the portable game device 1 and the information stored in the storage section 700 shown in FIG. 4. The RAM 1004 is used as a work area for the CPU 1000, and stores a given content of the ROM 1002 and the information storage medium 1006, image data of one frame, calculation results from the CPU 1000, and the like. The information storage medium 1006 is implemented by an IC memory card, a hard disk unit removable from the device main body, an MO, or the like.

The image generation IC 1008 is an integrated circuit which generates pixel information of a game screen displayed on the display device 1018 based on image information from the CPU 1000. The display device 1018 displays a game screen based on the pixel information generated by the image generation IC 1008. The image generation IC 1008 corresponds to the image generation section 330 shown in FIG. 4, and the display device 1018 corresponds to the image display section 400 shown in FIG. 4 and the displays 12A and 12B shown in FIG. 1.

The sound generation IC 1010 is an integrated circuit which generates game sound such as effect sound and BGM based on the information stored in the information storage medium 1006 and the ROM 1002. The generated game sound is output from the speaker 1020. The sound generation IC 1010 corresponds to the sound generation section 340 shown in FIG. 4, and the speaker 1020 corresponds to the sound output section 500 shown in FIG. 4 and the speaker 13 shown in FIG. 1.

The processes performed by the image generation IC 1008, the sound generation IC 1010, and the like may be executed by the CPU 1000, a general-purpose DSP, or the like by means of software.

The control device 1022 is a device for the player to input various game operations according to the progress of the game. The control device 1022 corresponds to the operation input section 100 shown in FIG. 4, the operation button 15 shown in FIG. 1, and the touch panel integrally formed in the display 12B.

The communication device 1215 is a device for exchanging various types of information utilized in the portable game device 1 with the outside. The communication device 1215 is connected with another game device, and is utilized to transmit and receive given information corresponding to the game program or transmit and receive information such as the game program through a communication line. The communication device 1215 corresponds to the wireless communication device 18 shown in FIG. 1 and the communication section 600 shown in FIG. 4.

<Effects>

According to this embodiment, each note is detected from the input sound in units of detection time t at specific time intervals, whether or not the sound input by the player coincides with the reference melody set for the egg selected for causing a character to be created is determined, and the character set for the egg is created when the input sound is determined to coincide with the reference melody. Whether or not the input sound coincides with the reference melody is determined based on (1) the distribution of the notes included in the input sound with respect to the passage of time, or (2) the total count of each note included in the input sound.

Specifically, (1) the degree of similarity between the distribution of the notes included in the reference melody with respect to the passage of time and the distribution of the notes included in the input sound with respect to the passage of time is calculated based on the similarity determination data 732c which is the data of the total count (reference total count) of each note included in the reference melody, and the input sound is determined to coincide with the reference melody when the degree of similarity satisfies the specific similarity condition.

Or, (2) whether or not the detection total count of each note included in the input sound satisfies the specific note count condition with respect to the reference note count which is the total count of each note included in the reference melody is determined based on the reference note count data 732h which is the data of the total count (reference total count) of each note included in the reference melody, and the input sound is determined to coincide with the reference melody when the the number of types of notes determined to satisfy the note count condition satisfies the note type count condition.

Specifically, whether or not to cause the character to be created is determined using a novel input sound processing method in which the input sound is analyzed based on each note detected from the input sound, and a new character is caused to appear based on the analysis results. Moreover, it becomes possible to flexibly determine whether or not to cause the character to be created, such as causing the character to be created when the input sound coincides with the reference melody to a certain extent, by appropriately specifying the conditions (e.g. similarity condition, note count condition, and note type count condition) for determining whether or not the input sound coincides with the reference melody.

<Modification>

The embodiments to which the invention can be applied are not limited to the above-described embodiments. Various modifications and variations may be made without departing from the spirit and scope of the invention.

(A) Reference Melody and Character Set for Egg

In the above-described embodiments, one reference melody and one character are set for one egg, whether or not the input sound coincides with the reference melody set for the selected egg is determined, and the character set for the selected egg is created when the input sound has been determined to coincide with the reference melody. Note that the following modification may also be employed.

(A-1) Whether or not the input sound coincides with the reference melody set for each of the eggs currently possessed by the player is determined without selecting an egg. A character set for the egg of which the reference melody has been determined to coincide with the input sound is created.

(A-2) One reference melody and a plurality of characters are set for one egg. Whether or not the input sound coincides with the reference melody set for the selected egg is determined. When the input sound has been determined to coincide with the reference melody, one character randomly selected from the characters set for the selected egg is created, for example.

In this case, a time condition (date or time) whereby a character can be created is set for each character, and a character of which the time condition is satisfied by the present date or time is created when the input sound has been determined to coincide with the set reference melody. Specifically, a special character and a normal character are set for one egg. A specific date (e.g. New Year's Day or Christmas) is set for the special character as the time condition, and a date other than the specific date is set for the normal character as the time condition. The time condition may be a season (e.g. spring, summer, autumn, and winter) within one year (365 days), or may be a time (e.g. morning, daytime, and night) within one day (24 hours), for example.

(A-3) A plurality of reference melodies and one character are set for one egg. Whether or not the input sound coincides with each of the reference melodies set for the selected egg is determined. When the input sound has been determined to coincide with one of the reference melodies, the character set for the selected egg is created.

(A-4) A plurality of pairs of a reference melody and a character are set for one egg. Whether or not the input sound coincides with the reference melody of each pair set for the selected egg is determined, and the character corresponding to the reference melody which has been determined to coincide with the input sound is created.

In this case, a time condition whereby the character can be created is set for each pair. Whether or not the input sound coincides with the reference melody is determined for each pair of which the time condition is satisfied by the present time. Specifically, two pairs of a reference melody and a character are set for one egg, for example. A specific day (e.g. Christmas) is set for one pair as the time condition, and a day other than the specific day is set for the other pair as the time condition. In this case, game playability can be improved by using a melody relating to the date, time, or the like set as the time condition for the pair as the reference melody.

(B) Predetermined Sound

In the above-described embodiments, the predetermined sound (melody) makes up a specific piece of music. Note that the predetermined sound (melody) may not make up a piece of music. Specifically, the predetermined sound (melody) may be familiar repeated sound such as a song of a living creature (e.g. Homoeogryllus japonicus or Robust cicada) or a fire engine or ambulance siren. In this case, an image indicating the predetermined sound may be displayed such as an image of Homoeogryllus japonicus, Robust cicada, a fire engine, or an ambulance on the melody input screen.

(C) Scale

The above-described embodiments have been described taking an example of a Western music scale (e.g. do, re, mi, fa, sol, la, ti, and do). Note that the invention can also be applied to other scales.

(D) Applicable Game Device

The above-described embodiments illustrate the case of applying the invention to the portable game device. Note that the invention can also be applied to other devices which can execute a game, such as a consumer game device, an arcade game device, and a portable telephone.

(E) Applicable Game

The above-described embodiments illustrate the case of applying the invention to the breeding game. Note that the invention can also be applied to other games in which a character appears, such as a role-playing game.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A game process control method which causes a computer including a microphone to execute a game in which a game character appears, the method comprising:
    detecting each note included in audible sound input from the microphone based on a sound signal from the microphone;
    acquiring a first analysis result by analyzing the audible input sound based on the detected notes;
    determining whether or not the first analysis result coincides with a second analysis result acquired by analyzing a predetermined sound including a plurality of notes, the predetermined sound being set in advance of the acquiring of the first analysis result;
    causing a new game character to appear when the first and second analysis results have been determined to coincide; and
    controlling display of each game character including the new game character.

2. The game process control method as defined in claim 1, wherein the notes included in the audible input sound are detected at specific time intervals;
    wherein distribution of the notes included in the audible input sound with respect to passage of time is analyzed based on the notes detected at the specific time intervals; and
    wherein whether or not the analyzed distribution of the notes included in the audible input sound with respect to passage of time satisfies a note distribution condition indicating distribution of the notes included in the predetermined sound with respect to passage of time is determined.

3. The game process control method as defined in claim 1, wherein the notes included in the audible input sound are detected at specific time intervals;
    wherein a detection total count of each of the detected notes is analyzed; and
    wherein whether or not the analysis of the detection total count satisfies a total count condition indicating a total count of each of the notes included in the predetermined sound is determined.

4. The game process control method as defined in claim 1, further comprising:
    detecting an input start timing of consecutively input notes based on the detected notes;
    wherein an input start timing of each of the notes included in the audible input sound is analyzed based on the detected input start timing; and
    wherein whether or not the analysis result of the input start timing satisfies a timing condition indicating an input start timing of each of the notes included in the predetermined sound is determined.

5. The game process control method as defined in claim 1, wherein the notes included in the audible input sound are detected in note name units.

6. The game process control method as defined in claim 1, wherein the audible input sound is subjected to a filtering process by detecting only the notes included in the audible input sound and having a specific intensity, and the notes included in the audible input sound subjected to the filtering process are detected.

7. The game process control method as defined in claim 6, further comprising:
    automatically adjusting intensities of the notes included in the audible input sound at a single time that have a harmonic overtone relationship;
    wherein the audible input sound of which a level of each note has been adjusted is subjected to the filtering process.

8. The game process control method as defined in claim 1, wherein a game character is associated in advance with each of a plurality of predetermined sounds;
    wherein whether or not the first analysis result of the audible input sound coincides with a second analysis result of each of the predetermined sounds is determined; and
    wherein the game character corresponding to the predetermined sound of which the second analysis result has been determined to coincide with the first analysis result of the audible input sound is caused to appear.

9. The game process control method as defined in claim 1, wherein a special character is associated in advance with a time condition relating to date and/or time at which the special character can be caused to appear; and
    wherein the special character is caused to appear when date and/or time at which the audible input sound is input from the microphone satisfies the time condition.

10. The game process control method as defined in claim 1, further comprising displaying a specific indication of the predetermined sound.

11. A non-transitory computer-readable information recording medium storing a program for causing a computer to execute the game process control method as defined in claim 1.

12. A game device comprising:
a microphone;
a note detection section which detects each note included in audible sound input from the microphone based on a sound signal from the microphone;
an analysis section which analyzes the audible input sound based on the notes detected by the note detection section and acquires a first analysis result;
a determination section which determines whether or not the first analysis result of the analysis section coincides with a second analysis result acquired when the analysis section analyzes a predetermined sound including a plurality of notes, the predetermined sound being set in advance of acquiring the first analysis result; and
a character appearance control section which causes a new game character to appear when the determination section has determined that the first and second analysis results coincide.

13. The game process control method as defined in claim 1, further comprising:
performing a plurality of different correlations between the analyzed audible input sound and the analyzed predetermined sound,
wherein the determining step includes calculating an average of the plurality of different correlations, and comparing the calculated average to a predetermined threshold value.

14. The game process control method as defined in claim 13, wherein the plurality of different correlations includes:
a comparison of total number of detected notes of the audible input sound to a total number of notes of the predetermined sound; and
a correlation of a sequence of the detected notes of the audible input sound to a sequence of the notes of the predetermined sound.

15. The game process control method as defined in claim 14, wherein a predefined number of notes are capable of being detected in each of a plurality of octaves, and
the plurality of different correlations include a comparison of a total number of each of a plurality of note name units of the audible input sound to a total number of each of a corresponding note name unit of the predetermined sound,
each note name unit corresponding to one of the predefined notes, as repeated among each of the plurality of octaves.

16. A game process control method which causes a computer including a microphone and a memory to execute a game in which a game character appears, the method comprising:
detecting each note included in audible sound input from the microphone based on a sound signal from the microphone;
acquiring a first analysis result by analyzing the audible input sound based on the detected notes;
determining whether or not the first analysis result coincides with a second analysis result acquired by analyzing a predetermined sound including a plurality of notes, the predetermined sound being stored in the memory in advance of the acquiring of the first analysis result;
causing a new game character to appear when the first and second analysis results have been determined to coincide; and
controlling display of each game character including the new game character.

* * * * *